United States Patent [19]
Ebbinghaus et al.

[11] Patent Number: 6,137,025
[45] Date of Patent: Oct. 24, 2000

[54] CERAMIC COMPOSITION FOR IMMOBILIZATION OF ACTINIDES

[75] Inventors: Bartley B. Ebbinghaus; Richard A. Van Konynenburg, both of Livermore, Calif.; Eric R. Vance, Kirrawee, Australia; Martin W. Stewart, Barden Ridge, Australia; Adam Jostsons, Eastwood, Australia; Jeffrey S. Allender, North Augusta; David Thomas Rankin, Aiken, both of S.C.

[73] Assignee: The United States of America as represented by the United States Department of Energy, Washington, D.C.

[21] Appl. No.: 09/337,510

[22] Filed: Jun. 22, 1999

Related U.S. Application Data

[60] Provisional application No. 60/090,312, Jun. 23, 1998.

[51] Int. Cl.⁷ ..................................................... G21F 9/00
[52] U.S. Cl. ........................... 588/10; 501/152; 501/155; 264/0.5; 252/625
[58] Field of Search ................................... 501/152, 155; 264/0.5; 252/625, 643; 588/10, 11

[56] References Cited

U.S. PATENT DOCUMENTS

| | | | |
|---|---|---|---|
| 4,274,976 | 6/1981 | Ringwood | 252/301.1 |
| 4,329,248 | 5/1982 | Ringwood | 252/628 |
| 5,597,516 | 1/1997 | Feng et al. | 252/625 |
| 5,613,243 | 3/1997 | Hollit et al. | 588/19 |
| 5,656,009 | 8/1997 | Feng et al. | 588/11 |

OTHER PUBLICATIONS

L.P. Hatch, "Ultimate Disposal of Radioactive Wastes," American Scientist, vol. 41, pp. 410–421 (1953).

R.E. Isaacson and L.E. Brownell, "Ultimate Storage of Radioactive Wastes in Terrestrial Environments," Management of Radioactive Wastes from Fuel Reprocessing, OECD Proceedings, Paris, pp. 953–986 (1972).

G.J. McCarthy and M.T. Davidson, "Ceramic Nuclear Waste Forms: I, Crystal Chemistry and Phase Formation," Bull. Am. Ceram. Soc., vol. 54, pp. 782–786 (1975).

R.W. Lynch, R.G. Dosch, B.T. Kenna, J.K. Johnstone, and E.J. Nowak, "The Sandia Solidification Process–A Broad Range Aqueous Waste Solidification Method," Proceedings of the IAEA Symposium on the Management of Radioactive Waste, IAEA–SM–207/75, Vienna, Austria, pp. 361–373 (Mar. 1976).

R. Roy, "Rational Molecular Engineering of Ceramic Materials," J. Am. Ceram. Soc., vol. 60, pp. 3580–35963 (1977).

A.E. Ringwood, "Safe Disposal of High Level Nuclear Reactor Wastes: A New Strategy," Australian National University Press, Canberra, Australia and Norwalk, CT (1978).

A.E. Ringwood, S.E. Kesson, N.G. Ware, W. Hibberson, and A. Major, "Immobilisation of High Level Nuclear Reactor Wastes in Synroc," Nature, vol. 278, pp. 219–223 (1979).

A.G. Solomah, T.M. Hare, and H. Palmour III, "Demonstration of the Feasibility of Subsolidus Sintering of Radwaste–Containing Synroc–B Composition," Nucl. Technol., vol. 49, pp. 183–185 (1980).

J. Campbell, C. Hoenig, F. Bazan, F. Ryerson, M. Guinan, R. Van Konynenburg, and R. Rozsa, "Properties of Synroc–D Nuclear Waste Form: A State–of–the–Art Review," UCRL–53240, pp. 1–23, Lawrence Livermore National Laboratory, Livermore, CA (Jan. 1982).

S.E. Kesson and A.E. Ringwood, "Safe Disposal of Spent Nuclear Fuel," Radioactive Waste Management and the Nuclear Fuel Cycle, vol. 4(2), pp. 159–174 (1983).

(List continued on next page.)

Primary Examiner—Paul Marcantoni
Attorney, Agent, or Firm—Randall W. Chang; William C. Daubenspeck; William R. Moser

[57] ABSTRACT

Disclosed is a ceramic composition for the immobilization of actinides, particularly uranium and plutonium. The ceramic is a titanate material comprising pyrochlore, brannerite and rutile.

9 Claims, 2 Drawing Sheets

Depiction of the processing region.

OTHER PUBLICATIONS

S.E. Kesson and A.E. Ringwood, "Immobilization of HLW in Synroc–E," Materials Research Society Symposium Proceedings, vol. 26, Scientific Basis for Nuclear Waste Management VII, G.L. McVay, ed., North–Holland, New York (1984), pp. 507–512.

F.W. Clinard, Jr., D.L. Rohr, and R.B. Roof, "Structural Damage in a Self–Irradiated Zirconolite–Based Ceramic," Nucl. Inst. And Meth. in Phys. Res. B1, pp. 581–586 (1984).

F.W. Clinard, Jr., "Self–Irradiation Effects in 238Pu–Substituted Zirconolite, I. Temperature Dependence of Damage," J. Nucl. Mater., vol. 126, pp. 245–254 (1984).

F.W. Clinard, Jr., R.J. Livak, L.W. Hobbs, and D.L. Rohr, "Structural Changes in 238Pu–Substituted Zirconolite on Recovery from the Metamict State," Materials Research Society Symposium Proceedings, vol. 50, Scientific Basis for Nuclear Waste Management IX, L.O. Werme, ed., Materials Research Society, Pittsburgh, PA (1985), pp. 371–378.

E.M. Foltyn, F.W. Clinard, Jr., J. Rankin, and D.E. Peterson, "Self–Irradiation Effects in 238Pu–Substituted Zirconolite: II. Effect of Damage Microstructure on Recovery," J. Nucl. Mater., vol. 136, pp. 97–103 (1985).

G.R. Lumpkin and R.C. Ewing, "Natural Pyrochlores: Analogues for Actinide Host Phases in Radioactive Waste Forms," Materials Research Society Symposium Proceedings, vol. 44, Scientific Basis for Nuclear Waste Management VIII, C.M. Jantzen, J.A. Stone, and R.C. Ewing, eds., Materials Research Society, Pittsburgh, PA (1985), pp. 647–654.

F.W. Clinard, Jr., "Review of Self–Irradiation Effects in Pu–Substituted Zirconolite," Ceramic Bulletin, vol. 65 No. 8, pp. 1181–1187 (1986).

A.G. Solomah, P.G. Richardson, and A.K. McIlwain, "Phase Identification, Microstructural Characterization, Phase Microanalyses and Leaching Performance Evaluation of Synroc–FA Crystalline Ceramic Waste Form," J. Nucl. Mater., vol. 148, pp. 157–165 (1987).

A.E. Ringwood, S.E. Kesson, K.D. Reeve, D.M. Levins, and E.J. Ramm, "Synroc," Chapter 4 in W. Lutze and R.C. Ewing, eds., Radioactive Waste Forms for the Future, North–Holland, New York (1988) pp. 233–250.

G.R. Lumpkin and R.C. Ewing, "Alpha–Decay Damage and Annealing Effects in Natural Pyrochlores: Analogues for Long–Term Radiation Damage Effects in Actinide, Pyrochlore Structure Types," Materials Research Society Symposium Proceedings, vol. 127, Scientific Basis for Nuclear Waste Management XII, W. Lutze and R.C. Ewing, eds., Materials Research Society, Pittsburgh, PA (1989), pp. 253–260.

F.W. Clinard, Jr., E.M. Foltyn, and R.C. Ewing, "Stored Energy in Natural Zirconolite and its Synthetic Counterpart after Alpha Recoil Self–Irradiation Damage," J. Nucl. Mater., vol. 185, pp. 202–207 (1991).

V.M. Oversby, R.A. Van Konynenburg, W.E. Glassley, and P.G. Curtis, "Immobilization in Ceramic Waste Forms of the Residues from Treatment of Mixed Wastes," Materials Research Society Symposium Proceedings, vol. 333, Scientific Basis for Nuclear Waste Management XVII, A. Barkatt and R.A. Van Konynenburg, eds., Materials Research Society, Pittsburgh, PA (1994), pp. 285–292.

R. Van Konynenburg, memorandum to Bill Halsey, "A Titanate Mineral Waste Form for Dismantled Weapons Plutonium," Lawrence Livermore National Laboratory, Livermore, CA (Feb. 10, 1994).

A. Jostsons, "Status of Synroc Development," Proc. of the 9th Pacific Basin Nuclear Conference, Sydney, Australia, May 1–6, 1994, Australian Nuclear Association, Inc., and the Institution of Engineers, Australia.

G.R. Lumpkin, K.P. Hart, P.J. McGlinn, and T.E. Payne, "Retention of Actinides in Natural Pyrochlores and Zirconolites," Radiochimica Acta 66/67, pp. 469–474 (1994).

A. Jostsons, A. Ridal, D.J. Mercer, and E.R. "Lou" Vance, "Experience Gained with the Synroc Demonstration Plant at Ansto and its Relevance to Plutonium Immobilization," pp. 347–358 in Final Proceedings, Plutonium Stabilization & Immobilization Workshop, CONF–951259, U.S. Department of Energy, Washington, D.C. (May 30, 1996).

B. Ebbinghaus, R. Van Konynenburg, E. Vance, A. Jostons, R. Anthony, C. Philip, and D. Wronkiewicz, "Status of Plutonium Ceramic Immobilization Processes and Immobilization Forms," pp. 253–261 in Final Proceedings, Plutonium Stabilization & Immobilization Workshop, CONF–951259, U.S. Department of Energy, Washington, D.C. (May 30, 1996).

B.B. Ebbinghaus, R.A. Van Konynenburg, J. M. Lawson, W. L. Close, P.G. Curtis, M.W.A. Stewart, E.R. Vance and M.L. Carter, "Progress on Ceramic Immobilized Forms for Pu Disposition", Presented at 20th Actinide Separations Conference, Ithaca, IL, USA, Jun. 13, 1996, (copy not provided).

A. Jostsons, E.R. Vance, R.A. Day, K.P. Hart and M.W.A. Stewart, "Surplus Plutonium Disposal Via Immobilisation in Synroc", presented at Specrum '96, International Topical Meeting on Nuclear and Hazardous Waste Management, pp. 2032–2039, Aug. 18–23, Seattle, WA, USA 1996.

B.B. Ebbinghaus, R.A. Van Konynenburg, H. Shaw, R. Ryerson, P.G. Curtis, W.L. Close, R. Burns, J.M. Lawson, E.R. Vance, M.W.A. Stewart, R.A. Day, M.J. Hambley, A. Brownscombe, J. Allender, T. Rankin, J. Congdon, E. Buck, A. Bakel, R. Putnam and A. Navrotsky, "Ceramic Formulation for the Immobilization of Plutonium", Presented at 21st Actinide Separations Conference, Charleston, SC, USA, Jun. 23–26, 1997.

Farmer, J.C., "U.S. Fissile Materials Disposition Program Form & Process Development Activities," UCRL–MI–127979, Lawrence Livermore National Laboratory, Livermore, CA (Jul. 1997), presentation: "Ceramic Formulation for the Immobilization of Plutonium" by B. Ebbinghaus, R. Van Konynenburg, E. Buck and L. Vance.

L.J. Jardine, G.A. Armantrout, W.L. Bourcier, W.A. Brummond, B. B. Ebbinghaus, H.F. Shaw, R.A. Van Konynenburg, and P. Zhao, "U.S.–Russian Experts NATO Collaborative Research Grant Exchange Visit Meetings on Excess Weapons Pu Ceramics Formulations and Characterizations," UCRL–ID–129328, Lawrence Livermore National Laboratory, Livermore, CA, relevant page attached (1997).

R.A. Van Konynenburg, B.B. Ebbinghaus, and H.F. Shaw, "Formulation of Ceramic for Plutonium Immobilization," UCRL–JC–128979–ABS (abstract for a talk at the American Chemical Society Spring Meeting), Lawrence Livermore National Laboratory, Livermore, CA (1997).

B. Ebbinghaus, R. Van Konynenburg, H. Shaw, P. Curtis, W. Close, R. Burns, E. Vance, M. Stewart, J. Allender, T. Rankin, and J. Congdon, "Ceramic Formulation for the Immobilization of Plutonium," UCRL–JC–127614–ABS (abstract for the 21st Annual Actinide Separations Conference, Charleston SC, Jun. 23–26, 1997) Lawrence Livermore National Laboratory, Livermore, CA (1997).

R. Van Konynenburg, B. Ebbinghaus, F. Ryerson, H. Shaw, and P. Curtis, "Development of a Ceramic Form for Immobilization of Excess Plutonium," pp. 125–126 in Conference Transactions: Plutonium Futures–The Science, Topical Conference on Plutonium and Actinides, LA–13338–C, Los Alamos National Laboratory, Los Alamos, NM (1997).

B.B. Ebbinghaus, R.A. Van Konynenburg, F. J. Ryerson, E.R. Vance, M.W.A. Stewart, A. Jostsons, J.S. Allender, T. Rankin and J. Congdon, "Ceramic Formulation for the Immobilization of Plutonium", Waste Management 98, Tucson Arizona, USA, Mar. 5, 1998.

R.A. Van Konynenburg and B.B. Ebbinghaus, "Ceramic Formulation for Plutonium Immobilization," UCRL–JC–130111–ABS (abstract for a presentation at the 22nd Annual Actinide Separations Conference), Lawrence Livermore National Laboratory, Livermore, CA (1998).

K.P. Hart, E.R. Vance, M.W.A. Stewart, J. Weir, M.L. Carter, M. Hambley, A. Brownscombe, R.A. Day, S. Leung, C.J. Ball, B. Ebbinghaus, L. Gray and T. Kan, "Leaching Behaviour of Zirconolite–rich Synroc used to Immobilise "High–fired" Plutonium Oxide", Scientific Basis for Nuclear Waste Management XXI, ed. I.G. McKinley and C. McCombie, Sep. 28 to Oct. 3, 1997, Davos, Switzerland, Materials Research Society Symposium Proceedings, vol. 506, pp. 161–168 (1998).

B.B. Ebbinghaus et al., "Plutonium Immobilization Project Baseline Formulation," UCRL–ID–133089, PIP–99–012, Lawrence Livermore National Laboratory, Livermore, CA, pp. 21–31, (Feb. 1999).

E. R. Vance, A. Jostsons, S. Moricca, M. W. A. Stewart, R. A. Day, B. D. Begg, M. J. Hambley, K. P. Hart and B. B. Ebbinghaus, "Synroc Derivatives for Excess Weapons Plutonium, in Ceramics", Presented at the 100th Annual Meeting of the Amer. Ceram. Soc., Cincinatti, OH, May 4–6, 1998, published in Environmental Issues and Waste Management Technologies IV, Ceramic Transactions, vol. 93, Edited by J. C. Marra and G. T. Chandler, American Ceramic Society, Westerville, OH, USA, pp 323–329 (1999).

E. R. Vance, J. N. Watson, M. L. Carter, R. A. Day, G. R. Lumpkin, K. P. Hart, Y. Zhang, P. J. McGlinn, M. W. A. Stewart and D. J. Cassidy, "Crystal chemistry, radiation effects and aqueous leaching of brannerite, UTi2O6", 101st American Ceramic Society Annual Meeting, Indianapolis, Apr. 25–28, 1999, Waste Management Science and Technology in the Ceramic and Nuclear Industries, in press.

M. W. A. Stewart, E. R. Vance, R. A. Day, S. Leung. A. Brownscombe and M. L. Carter, "Impurity incorporation in Pyrochlore–rich Ceramics", 101st American Ceramic Society Annual Meeting, Indianapolis, Apr. 25–28, 1999, Waste Management Science and Technology in the Ceramic and Nuclear Industries, in press.

M.W.A. Stewart, E.R. Vance, R.A. Day and B.B. Ebbinghaus, "Dispersion of Impurities in Pyrochlore/Zirconolite Based Ceramics", Abstract, Presented at HLW and Pu Immobilisation Meeting, Workshop at CEA–INSTN Saclay, Apr. 22–23, 1999, Saclay France.

A.Jostons, L. Vance and B. Ebbinghaus, "Immobilization of Surplus Plutonium in Titanate Ceramics", Proceedings of the International Conference on Future Nuclear Systems, Aug. 29–Sep. 3, 1999; Jackson Hole, Wyoming, USA, CD–ROM.

A. Jostsons, E. R. Vance and G. Durance, "Advances in Synroc Development", Proceedings of 11th Pacific Basin Nuclear Conference, Banff, Canada, May 3–7, 1998; pp 307–15.

E. R. Vance, A. Jostsons, M. W. A. Stewart, R. A. Day, B. D. Begg, M. J. Hambley, K. P. Hart and B. B. Ebbinghaus, "Immobilization of Pu–rich Wastes in Synroc", Extended abstract, Plutonium Futures–The Science, Topical Conference on Plutonium and Actinides, Santa Fe, New Mexico, Aug. 25–27, 1997; p. 19 of Report LA–13338–C.

A. Jostsons and E. R. Vance, "Surplus Plutonium Immobilization in Titanate Ceramics", ANS Third Topical Meeting on DOE Spent Fuel and Fissile Material Management, Charleston, SC; Sep. 8–11, 1998.

R. Van Konynenburg, "Expected radiation effects in plutonium immobilization ceramic", UCRL–ID–128580, pp. 4–6, Sep. 1997.

S. Cochran et al, "Fissile Material Disposition Program Final Immobilization Form Assessment and Recommendation", UCRL–ID–128705, pp. 24–29, Oct. 3, 1997.

W. Brummond et al, "Fissile Materials Disposition Program Tech Eval Panel Summary Report: Ceramic and Glass Immobilization Options", UCRL–ID–129315, pp. 5–3 to 5–9, Dec. 23, 1997.

T. Gould et al, "Evaluation of Candidate Glass and Ceramic Forms for Immobilization of Surplus Plutonium", UCRL–JC–130952, Jun. 12, 1998.

Depiction of the processing regime.

Phase boundaries in the system Ca(Hf,Zr)Ti$_2$O$_7$-Ca(Pu,Ce)Ti$_2$O$_7$-CaUTi$_2$O$_7$.

6,137,025

CERAMIC COMPOSITION FOR IMMOBILIZATION OF ACTINIDES

CROSS-REFERENCE TO RELATED APPLICATIONS

This application claims the benefit of U.S. Provisional Application Ser. No. 60/090,312, filed Jun. 23, 1998, entitled "Ceramic Composition and Process for Immobilization of Actinides", which is incorporated herein by this reference.

STATEMENT OF GOVERNMENT INTEREST

The United States Government has rights in this invention pursuant to Contract No. W-7405-ENG-48 between the U.S. Department of Energy and the University of California.

BACKGROUND OF THE INVENTION

1. Field of the Invention

The present invention relates generally to a new ceramic composition for immobilizing actinides, in particular plutonium, thorium, and uranium. The present invention relates particularly to a ceramic composition comprising pyrochlore, brannerite and rutile. The ceramic composition is attractive for immobilization of excess plutonium because of its extremely low leachability, the existence of natural mineral analogues that have demonstrated actinide immobilization over hundreds of millions of years in wet geological environments, and the high solid solubility of actinides in the ceramic thus providing a relatively low overall waste volume. Incorporation of plutonium into ceramic provides a form that is relatively easy to store but renders retrieval of the plutonium to be more difficult than other immobilized forms.

2. Description of Related Art

Because of their extreme durability, ceramic forms have been studied extensively since the late 1970s for the immobilization of high level waste (HLW). The material called Synthetic Rock (SYNROC) is a titanate-based ceramic composed approximately of 30% zirconolite, 30% hollandite, 30% perovskite and 10% rutile. In the HLW application, actinides partition into the zirconolite and perovskite phases. U.S. Pat. No. 4,274,976 (Ringwood), U.S. Pat. No. 4,329,248 (Ringwood), U.S. Pat. No. 4,645,624 (Ramm, Ringwood) and U.S. Pat. No. 4,808,337 (Ramm et al.) disclose the immobilization of HLW in synthetic rock.

A form of synthetic rock to immobilize spent fuel (SYNROC-F) was reported by S. E. Kesson and A. E. Ringwood, "Safe Disposal of Spent Nuclear Fuel", Radioactive Waste Management and the Nuclear Fuel Cycle, Vol. 4(2), pp. 159–174, October 1983. This form of SYNROC consisted of 90 wt % uranium pyrochlore, 5 wt % hollandite and 5 wt % rutile.

A variant of SYNROC-F, namely SYNROC-FA, was reported by A. G. Solomah, P. G. Richardson and A. K. McIlwain, "Phase Identification, Microstructural Characterization, Phase Microanalyses and Leaching Performance Evaluation of SYNROC-FA Crystalline Ceramic Waste Form", Journal of Nuclear Materials 148, pp. 157–165, 1987. This form of SYNROC consisted of uranium pyrochlore, perovskite, uraninite and hollandite.

A cold press and sinter process is used in the production of mixed oxide (MOX) fuel from uranium and plutonium. The MOX process uses pressing pressures in excess of 20,000 psi and sintering temperatures of 1,700 deg C in a 4% $H_2$ atmosphere on a 24 hour cycle. Because the final product is to be used as fuel, impurities in the feedstock cannot be tolerated.

SUMMARY OF THE INVENTION

An object of this invention is to provide a ceramic material for immobilization of actinides, including plutonium, uranium, thorium, americium and neptunium, said immobilized actinides then being suitable for storage in an underground repository.

The desired characteristics of such a ceramic material include: a) low leachability, b) high solid solubility of actinides in the ceramic, c) ability to incorporate "high-fired" $PuO_2$ of various particle sizes, with particle size less than 2 millimeters, preferably less than 150 microns, d) sufficient compositional flexibility to incorporate significant concentrations of Pu and neutron absorbers (such as gadolinium and hafnium) as well as varying impurities in the feed streams, e) thermal stability during high level waste glass pouring in can-in-canister configurations, f) high chemical durability in the geologic repository environments both before and after undergoing radiation damage from alpha decay, g) difficult recoverability of plutonium from the ceramic to impede proliferation.

The present invention relates to a ceramic composition comprising pyrochlore, brannerite and rutile. A pyrochlore matrix provides the means to incorporate a higher concentration of plutonium than a zirconolite matrix. SYNROC compositions have contained hollandite, which the present composition does not. Other compositions have utilized reactive plutonium (such as dissolved plutonium) whereas the present composition starts with unreactive ("high fired") plutonium. The present composition also tolerates up to 55.7 wt % impurities in the actinide feedstocks. The present composition has been found to be stable when subjected to high level waste glass pouring in a storage canister. More specifically the mineralogical composition remains unchanged and the pellets retain their physical integrity.

DETAILED DESCRIPTION OF THE INVENTION

Figure 1:
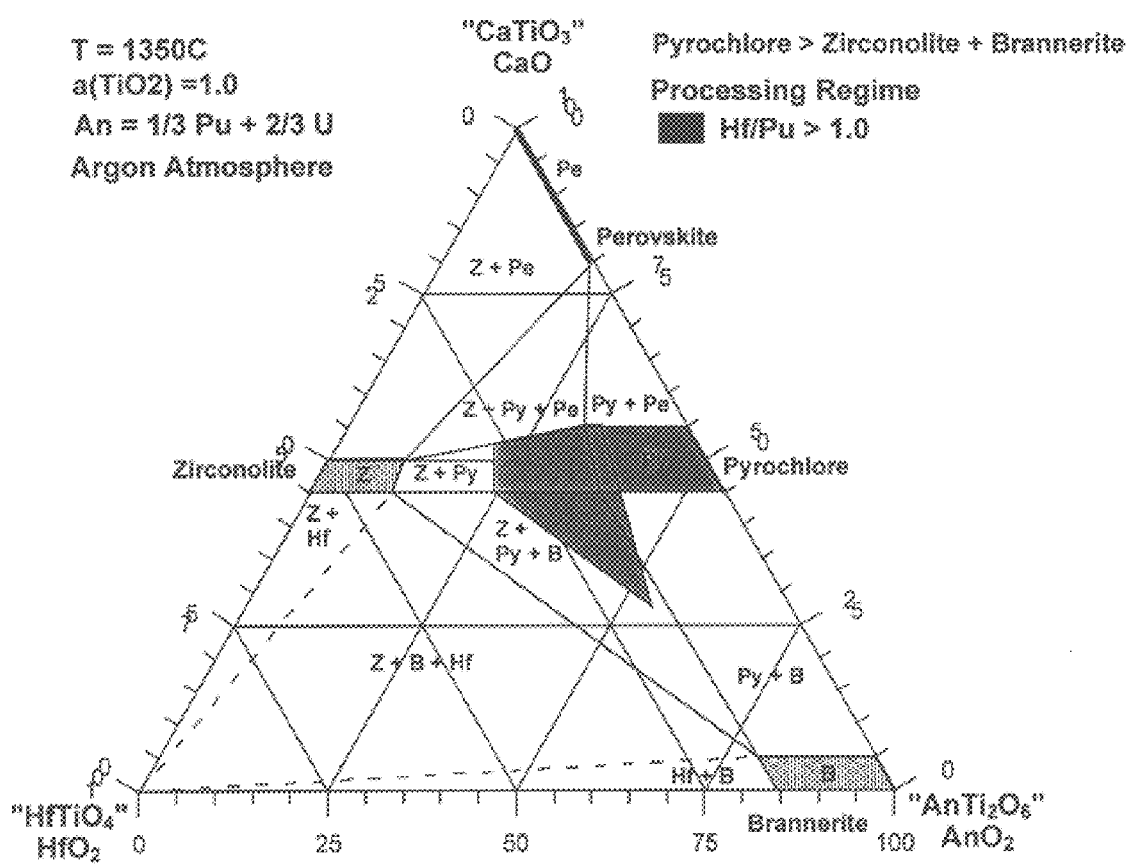
FIG. 1 illustrates the processing regime for the inventive ceramic.

Abbreviations
Al—aluminum
Am—americium
ANSTO—Australian Nuclear Science and Technology Organization
Ba—barium
Ca—calcium
Ce—cerium
cm—centimeter
Cr—chromium
deg C—temperature measured in degrees Celsius
DWPF—Defense Waste Processing Facility
EDS—energy-dispersive spectrometry
Ga—gallium
Gd—gadolinium
H—hydrogen
Hf—hafnium
HLW—High Level Waste
LLNL—Lawrence Livermore National Laboratory
Mo—molybdenum
MOX—mixed oxides
MPa—megaPascals
MT—metric ton Na—sodium
Ni—nickel
Np—neptunium
O—oxygen
P—phosphorus
ppm—parts per million
psi—pounds per square inch
Pu—plutonium
PUREX—plutonium-uranium extraction
SEM—scanning electron microscopy
Si—silicon
Sm—samarium
SRS—Savannah River Site
SYNROC—synthetic rock
Ta—tantalum
Th—thorium
Ti—titanium
U—uranium
vol %—volume percent
W—tungsten
wt %—weight percent
ZPPR—Zero Power Physics Reactor
Zn—zinc
Zr—zirconium
Definitions
actinide oxide—a mineral phase of the form $AnO_2$, where An is generally U, but can include Th, Np, Pu and Am
brannerite—a mineral phase of the form $CTi_2O_6$ where C is an actinide selected from the group consisting of U, Pu, Th, Np, and Am.
calcining—heating materials to high temperatures to drive off water and other volatile substances
high fired—heated or fired at temperatures greater than 650 deg C
hollandite—a mineral phase having the approximate composition $BaAl_2Ti_6O_{16}$
monazite—a mineral phase having the approximate composition $CePO_4$
perovskite—a mineral phase having the approximate composition $CaTiO_3$
pyrochlore—a cubic mineral phase of the form: $A_2Ti_2O_7$, where A can be any of a range of ions, including Ca, Gd, Hf, Sm, U, Pu, Th, Np and Am.
rutile—$TiO_2$
simulated DWPF thermal cycle—a thermal cycle that simulates the pouring and cooling of high level waste glass around cans containing the ceramic, in the DWPF as part of the DOE disposition process
tonnes—metric tons, 1000 kilograms
whitlockite—a mineral phase having the approximate composition $Ca_3(PO_4)_2$
zirconolite—$CaATi_2O_7$ where A is selected from the group consisting of Zr, Hf, Gd and Sm
Ceramic Formulation A novel formulation of titanate-based minerals has been discovered to be capable of effectively immobilizing actinides. Said actinides include plutonium, uranium, thorium, americium and neptunium, preferably uranium and plutonium. Other radioactive materials such as transuranic and high-level wastes that contain significant amounts of actinides may be immobilized in this ceramic composition where said actinides in the waste have been concentrated prior to immobilization in the ceramic form.

This formulation consists primarily of pyrochlore, brannerite and rutile. Immobilization in the baseline formulation is accomplished by elemental substitution of the plutonium into lattice sites of pyrochlore. Pyrochlore provides the means to incorporate higher quantities of actinides than with zirconolite. This formulation demonstrates the ability to incorporate a high uranium and plutonium concentration (elemental up to 32 wt %, in oxides form up to 36 wt %) without significant changes in properties or mineralogy. Neutron absorber loadings (gadolinium, hafnium, samarium) are not affected by interchanging uranium for plutonium. Pyrochlore is less susceptible than zirconolite to long term, radiation induced damage effects from alpha decay of the plutonium that would lead to enhanced dissolution of the waste form during exposure to groundwater. Naturally occurring pyrochlores can retain actinides for billions of years even when extensive secondary alteration due to contact with fluids at temperatures less than 100 deg C has occurred.

The ceramic form has been found to be two to four orders of magnitude more durable than alternate glass forms as measured by dissolution rates in aqueous solution. Plutonium in the immobilized form cannot be extracted and purified by currently existing standard processes, such as the PUREX process. Significant changes in the head end processing would be required.

The immobilization form is capable of incorporating "high-fired" plutonium oxide 2 millimeters in diameter or less, preferably less than 150 microns, directly into the form. The milled actinide powder particle size is 50 microns or less, preferably nominally 20 microns. The immobilization form is capable of incorporating a wide variety of impurities relevant to the plutonium disposition mission, up to 55.7 wt %. Impurity compositions up to 13 wt % in the product form were tested with no apparent detriment to the form.

FIG. 1 shows a preliminary processing regime that defines the compositional space in which the ceramic is generated. The amount of pyrochlore is greater than 50% volumetric fraction, preferably 80% volumetric fraction. The amount of brannerite is up to 50% volumetric fraction, preferably 12%. The amount of zirconolite is up to 50% volumetric fraction, preferably 0%. The amount of rutile is up to 20% volumetric fraction, preferably 8%. The amount of actinide oxide is up to 1% volumetric fraction, preferably less than 0.5%. Other phases may also be present, up to 10% volumetric fraction, preferably 0%. Said other phases can be silicate, whitlockite, monazite, perovskite, magnesium titanate, ilmenite, pseudobrookite, corundum, calcium uranium vanadate, hafnium titanate, magnesium aluminum titanate, magnetoplumbite, or calcium aluminum titanate. The process is further described in patent application entitled "Process For Making A Ceramic Composition For Immobilization Of Actinides", by inventors: Bartley B. Ebbinghaus, Richard A. Van Konynenburg, Eric R. Vance, Martin W. Stewart, Philip A. Walls, William Allen Brummond, Guy A. Armantrout, Paul G. Curtis, Beverly F. Hobson, Joseph Farmer, Connie Cicero Herman, David Thomas Herman, which is incorporated herein by reference.

To maintain criticality control, especially where the actinide is plutonium, the ceramic should contain an adequate amount of neutron absorbers (such as hafnium, gadolinium and samarium). The preferred amounts are defined as overall molar ratios of Hf-to-Pu and Gd-to-Pu such that both are equal to or greater than unity.

To depict on a ternary phase diagram the processing regime in which the ceramic is formed (See FIG. 1), the number of variables had to be reduced from 6 (the number of oxide components) to 3. Since $UO_2$ and $PuO_2$ are known to be interchangeable in the formulation without changing the compositional phase boundaries, they can be considered as one oxide ($AnO_2$), thus reducing the number of variables to 5. The form is designed to contain excess rutile, which is essentially pure $TiO_2$, so its activity is fixed at unity, thus reducing the number of variables to 4. Gd is known to partition relatively evenly between the primary actinide-bearing phases, pyrochlore, zirconolite, and brannerite. Consequently, the Gd can be factored out without inducing too much error, thus reducing the number of variables to the desired value of 3. The resulting ternary phase diagram is depicted in FIG. 1. Perovskite is abbreviated as "Pe." Pyrochlore is abbreviated as "Py." Zirconolite is abbreviated as "Z." Brannerite is abbreviated as "B," and $HfTiO_4$ is abbreviated as "Hf." The "acceptable" processing regime is identified by the diagonal lined region in FIG. 1. In the process planned for actual disposition, $UO_2$ and $PuO_2$ will be added to a preblended mixture of the other components. The composition of the preblended mixture would fall at approximately 0.25 units of $HfO_2$ and 0.75 units of CaO. Addition of $UO_2$ and/or $PuO_2$ would cause the resulting mixture to fall on a straight line between this point and the $AnO_2$ point. The intersection of this imaginary line with the identified "acceptable" processing range indicates that there is a fairly wide range of $UO_2$ and/or $PuO_2$ compositions that lie within the "acceptable" range.

Baseline Formulation Chemistry

The pyrochlore-based baseline product form is observed to be composed of about 80 vol % pyrochlore, about 12 vol % brannerite, and about 8 vol % rutile. Zirconolite can also be present, but it is not generally observed when the sample is well reacted and when there are no feed impurities present. Pyrochlore and zirconolite are very closely related minerals. The primary difference in the structures arises from the way the characteristic layers of $TiO_6$ octahedra are stacked. Zirconolite actually has several structural polytypes that also differ in the way the characteristic layers are stacked: zirconolite-2M, zirconolite-3T, and zirconolite-4M (polymygnite) to name those that have actually been observed in this ceramic form. The number corresponds to the number of layers before the stacking repeats itself and the letter stands for the crystal symmetry, M for monoclinic and T for trigonal. When the layers are aligned in a body-centered fashion, the pyrochlore phase is formed.

Figure 2:
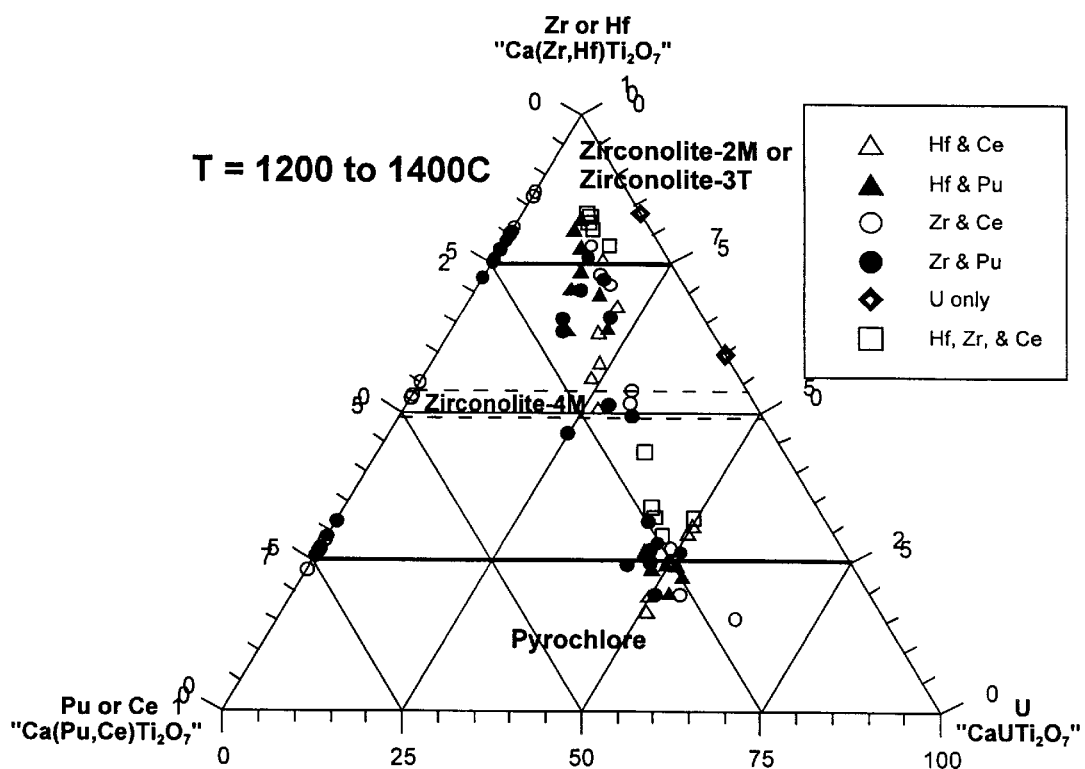
FIG. 2 illustrates the phase boundaries in the zirconolite, and plutonium, uranium pyrochlore system.

The phase relationship between pyrochlore and zirconolite and its polytypes is one important part of defining the baseline formulation. To depict the phase relationships, a pseudo-ternary diagram is given in FIG. 2. The end points are zirconolite ($CaZrTi_2O_7$ or $CaHfTi_2O_7$), Pu-pyrochlore ($CaPuTi_2O_7$ or its surrogate $CaCeTi_2O_7$), and U-pyrochlore ($CaUTi_2O_7$). The open points are data from Ce-loaded samples, and the solid points are data from the Pu-loaded samples. The squares contain Hf and Zr, and the diamonds contain U only. The circles are data from the Zr-loaded samples, and the triangles are from the Hf-loaded samples. Many of the samples contain Gd, which had to be factored out in order to depict all the data on one ternary diagram. For simplicity the Gd was all assumed to be entirely on the Ca site, which is accurate in many cases. As a result of this assumption, FIG. 2 is more correctly described as a ternary plot consisting of the three components, (1) Pu or Ce, (2) Hf or Zr, and (3) U. The baseline composition in this diagram is at approximately 0.49 units of U, 0.25 units of Pu, and 0.26 units of Hf.

FIG. 2 clearly shows that the equilibrium phase behavior of Hf and Zr and of Ce and Pu are for all practical purposes indistinguishable. Closer inspection reveals that the equilibrium phase behavior of U is also identical to that of Ce and Pu, i.e., the pyrochlore phase boundary is independent of the total U, Pu, and Ce composition. Note that with a comparable offset adjustment in the U-loading, the Pu-loading in the form can be adjusted anywhere from 0 to about 32% without appreciably changing the mineralogy in the baseline form. The regime above 0.7 units of Ce, Pu, and U is the pyrochlore single-phase regime. The region above about 0.8 units of Hf and Zr is the single phase zirconolite regime (–2M). There is some scatter in the zirconolite boundary. This is due at least in part to a temperature effect. At around 1400 deg C, the boundary appears to be closer to about 0.75 formula units, and at around 1200 deg C, the boundary appears to be closer to about 0.85 formula units. An intermediate phase generally occurs at about 0.5 formula units of Hf or Zr. This is the zirconolite-4M phase. This phase is generally not observed in samples with impurities.

Microprobe analyses on a number of samples have been averaged to give the nominal atomic compositions of the primary phases in the ceramic form. The nominal atomic compositions are given in Table I. For zirconolite and pyrochlore, the total metal composition is normalized to 4. For brannerite, the total metal composition is normalized to 3, and for rutile and actinide oxide, it is normalized to unity. The corresponding amount of oxygen based on the assumed oxidation states shown is given in the O equivalent column. In the ideal structures, the oxygen equivalents for pyrochlore, zirconolite, brannerite, rutile, and actinide oxide are 7, 7, 6, 2, and 2, respectively.

TABLE I

| | Elemental compositions in baseline form | | | | | | | | |
|---|---|---|---|---|---|---|---|---|---|
| Phase | Ca | Gd | Hf | U | Pu | Ti | Al | Total Metal | O equiv. |
| Pyrochlore | 0.905 | 0.217 | 0.265 | 0.432 | 0.237 | 1.905 | 0.037 | 4.00 | 6.964 |
| Zirconolite | 0.741 | 0.147 | 0.839 | 0.133 | 0.116 | 1.842 | 0.181 | 4.00 | 7.093 |
| Brannerite | 0.071 | 0.110 | 0.135 | 0.534 | 0.212 | 1.888 | 0.050 | 3.00 | 5.849 |
| Rutile | 0.000 | 0.000 | 0.083 | 0.010 | 0.000 | 0.900 | 0.007 | 1.00 | 1.997 |
| Actinide Oxide | 0.079 | 0.045 | 0.029 | 0.426 | 0.381 | 0.015 | 0.025 | 1.00 | 1.886 |
| Assumed Oxidation State | 2+ | 3+ | 4+ | 4+ | 4+ | 4+ | 3+ | | |

One of the interesting features in the compositions shown in Table I is that although the phase boundaries appear to be the same for the use of either $UO_2$ or $PuO_2$ in the formulation, the elemental partitioning between the phases is different. Notice that U is enriched relative to Pu in the brannerite phase and depleted relative to Pu in the zirconolite phase. These enriched and depleted relationships are based on comparison to the approximate 2-to-1 ratio of U-to-Pu in the dominant pyrochlore phase, which corresponds to the U-to-Pu ratio in the ceramic composition as a whole.

3Actinide Oxide Dissolution Kinetics

Dissolution of "high-fired" $PuO_2$ or $PuO_2/UO_2$ into the ceramic form seems to be affected significantly by temperature and process impurities, and to a lesser extent by the relative abundance of the primary phases. Note that all "high-fired" $PuO_2$ used in these tests was heated to 1000 deg C for 4 hours in an air atmosphere and all the "high-fired" $PuO_2/UO_2$ was heated to 950 deg C for 2 hours in an argon atmosphere.

In earlier formulation work, a zirconolite-rich formulation was being developed, and data on actinide dissolution kinetics was obtained for this formulation. In addition to the matrix phase of zirconolite, the form contained Ba-hollandite, rutile, and pyrochlore. In this set of experiments performed at LLNL, the "high-fired" $PuO_2$ was sieved through a 600 mesh sieve (i.e., the particles were less than 20 microns diameter) and the precursors were then dry mixed by hand in a V-shaped mixer. A half dozen pellets were pressed at between 30 and 80 MPa and fired at 1300 deg C for 4 hours. After the first firing, the product densities varied from about 89 to 96% of the theoretical maximum (4.9 g/cm$^3$). The samples were then separated into 3 pairs and fired at 1300, 1350, or 1400 deg C for 4 hours. One of each pair was then subjected to a simulated DWPF thermal cycle. Results of the thermal treatment tests are discussed later. All of the product pellets were analyzed using an SEM/microprobe. The pellets with the 1300 deg C final firing temperature had large chunks of "unreacted" $PuO_2$ up to about 20 microns in diameter. The $PuO_2$ is termed "unreacted" in this case since it was found to be essentially pure $PuO_2$. The pellets fired at 1350 deg C had a small amount of "reacted" $PuO_2$, typically 3 microns in diameter or less. The $PuO_2$ is termed "reacted" in this case because it was found to contain significant and consistent amounts of Gd and Zr. Only one "reacted" $PuO_2$ grain barely larger than 2 microns diameter was found in the sample with the final firing temperature of 1400 deg C. From these data it is clear that 1300 deg C is an inadequate temperature to achieve $PuO_2$ dissolution into the zirconolite-rich ceramic form. However, 4 hours at 1350 deg C appears to be adequate time and temperature to achieve dissolution of $PuO_2$ particles up to about 20 microns in diameter into the zirconolite-rich ceramic matrix. Apparently, the reaction kinetics increase significantly between 1300 and 1350 deg C. It is not known for certain, but the significant increase in reaction kinetics is believed to be the result of a minor liquid phase that forms at temperatures greater than about 1325 deg C.

Of course, the current baseline formulation is pyrochlore-rich, not zirconolite-rich. In more recent work performed at ANSTO, a mixture of "high-fired" $PuO_2/UO_2$ (1 part Pu per 2 parts U) was dry-milled with ceramic precursors, pressed into pellets at about 90 MPa and fired at temperatures ranging from 1275 to 1400 deg C for 4 hours. The $PuO_2/UO_2$ feed material was composed of a number of large agglomerates greater than 10 microns, but less than about 20 microns in diameter. Most firings were performed in an argon atmosphere, but some were performed in air. The results suggest that the particle size requirements for the pyrochlore-based form are less stringent than for the previously mentioned zirconolite-rich form. Enhanced dissolution was generally observed as the temperature was increased, but even at 1300 deg C the $PuO_2/UO_2$ dissolution was satisfactory, much better than in the previously mentioned work on the zirconolite-rich formulation. All residual $PuO_2/UO_2$ in the pyrochlore-rich ceramic form fell into the category of "reacted," i.e., it contained significant and relatively consistent amounts of Gd and Hf.

Two other important general observations have been made. First, the residual "reacted" $PuO_2/UO_2$ in the pyrochlore-rich formulation is essentially always observed to be encapsulated within the brannerite grains. This indicates that by decreasing the amount of the brannerite component in the formulation, enhanced $PuO_2$ and/or $UO_2$ dissolution can be obtained. Second, feed impurities such as silica enhance $PuO_2$ and/or $UO_2$ dissolution considerably. Since feed impurities can also aid densification, their presence in limited quantities can be advantageous to the ceramic form. Note that although a reactive "low-fired" $PuO_2$ was never tested, it has been found that a sufficiently small $PuO_2$ and/or $UO_2$ particle size and good mixing are more than sufficient to achieve dissolution of $PuO_2$ and/or $UO_2$ into the ceramic form. Therefore, any enhanced dissolution into the ceramic form that could be gained by using "low-fired" $PuO_2$ is not required.

Feed Impurity Tolerances

Tolerance of the ceramic form to the range of feed impurities expected is an important part of making the ceramic form a viable and attractive candidate for Pu disposition. A relatively large amount of work was conducted in this area at LLNL, SRS, and ANSTO. A set of 10 Pu-sample compositions and 10 Ce-sample compositions were prepared according to the general procedure described in the experimental section. Pu-sample compositions are given in Table II. Composition A-0 is the baseline ceramic form. Compositions A-1 to A-6 correspond to various general categories of feed material that are expected. A-1 corresponds to typical impure oxides. Nominally about 5 metric tons (MT) of currently declared U.S. excess Pu falls into this category. A-2 corresponds to the composition of Pu from the Zero Power Physics Reactor (ZPPR) plates. Nominally about 3 MT of current excess Pu falls into this category. A-3 corresponds to the composition of atypical impure metal. Nominally about 2 MT of current excess Pu falls into this category. A-4 corresponds to the composition of atypical clean metal. Nominally about 1 MT of current excess Pu falls into this category. A-5 corresponds to the composition of U/Pu oxides. Nominally about 1 MT of current excess Pu falls into this category. A-6 corresponds to the composition of Pu alloys. Nominally about 1 MT of current excess Pu falls into this category. A-7 is an overall estimated average composition for the 17 MT excess Pu case. A-8 is an estimated most extreme case. A-9 is an intermediate case between A-7 and A-8 that corresponds roughly to one of the extreme compositions tested in the competing glass formulation work.

TABLE II

Compositions of samples fabricated in the feed impurity tests
(Totals may not exactly equal 100% because of rounding.)

|  | A-0 wt % | A-1 wt % | A-2 wt % | A-3 wt % | A-4 wt % | A-5 wt % | A-6 wt % | A-7 wt % | A-8 wt % | A-9 wt % |
|---|---|---|---|---|---|---|---|---|---|---|
| | Base Feed Materials | | | | | | | | | |
| CaO | 9.95 | 9.67 | 9.89 | 9.73 | 9.92 | 9.85 | 9.83 | 9.80 | 8.65 | 9.44 |

TABLE II-continued

Compositions of samples fabricated in the feed impurity tests
(Totals may not exactly equal 100% because of rounding.)

|  | A-0 wt % | A-1 wt % | A-2 wt % | A-3 wt % | A-4 wt % | A-5 wt % | A-6 wt % | A-7 wt % | A-8 wt % | A-9 wt % |
|---|---|---|---|---|---|---|---|---|---|---|
| $TiO_2$ | 35.87 | 34.88 | 35.64 | 35.08 | 35.77 | 35.50 | 35.43 | 35.34 | 31.20 | 34.04 |
| $HfO_2$ | 10.65 | 10.35 | 10.58 | 10.41 | 10.62 | 10.54 | 10.52 | 10.49 | 9.26 | 10.11 |
| $Gd_2O_3$ | 7.95 | 7.73 | 7.90 | 7.77 | 7.93 | 7.87 | 7.85 | 7.83 | 6.91 | 7.54 |
| $UO_2$ | 23.69 | 23.03 | 23.54 | 23.17 | 23.63 | 23.45 | 23.40 | 23.34 | 20.60 | 22.48 |
| $PuO_2$ | 11.89 | 11.56 | 11.81 | 11.63 | 11.86 | 11.77 | 11.75 | 11.71 | 10.34 | 11.28 |
| Impurities | | | | | | | | | | |
| $Al_2O_3$ | | 0.63 | 0.20 | 0.22 | | 0.11 | 1.04 | 0.32 | 1.59 | 0.50 |
| MgO | | 0.19 | | 0.23 | 0.02 | 0.46 | 0.18 | 0.13 | 0.87 | 0.44 |
| $CaCl_2$ | | 0.37 | | | | | | 0.16 | 2.19 | 0.66 |
| $Ga_2O_3$ | | | | 1.27 | 0.14 | | | 0.14 | | 0.57 |
| $Fe_2O_3$ | | 0.17 | | 0.14 | | 0.16 | | 0.08 | 0.50 | 0.15 |
| $Cr_2O_3$ | | 0.04 | | 0.02 | | | | 0.02 | 0.13 | 0.08 |
| NiO | | 0.08 | | 0.09 | | | | 0.04 | 0.33 | 0.13 |
| $CaF_2$ | | 0.21 | | | | | | 0.12 | 1.30 | 0.44 |
| $K_2O$ | | 0.15 | | 0.04 | | | | 0.07 | 1.05 | 0.32 |
| $Na_2O$ | | 0.16 | | | | | | 0.06 | 0.47 | 0.14 |
| $MoO_2$ | | 0.05 | 0.44 | | | 0.30 | | 0.11 | 0.47 | 0.28 |
| $SiO_2$ | | 0.51 | | | | | | 0.19 | 1.50 | 0.46 |
| $Ta_2O_5$ | | 0.05 | | 0.15 | | | | 0.06 | 0.64 | 0.19 |
| $B_2O_3$ | | 0.04 | | | | | | | 0.34 | 0.17 |
| $WO_2$ | | 0.14 | | 0.06 | | | | | 1.64 | 0.49 |
| ZnO | | | | | 0.11 | | | 0.01 | | 0.07 |

Sample preparation and characterization work were shared among the various participating sites. Samples A-1 to A-6 were generally prepared only at one site, whereas samples A-0, A-7, A-8, and A-9 were prepared at two or three different sites. At least one Ce-sample and one Pu-sample of each composition were successfully prepared. All of the Ce-samples and most of the Pu-samples have since been characterized to determine the product phase assemblages. All of the samples reacted well and formed pyrochlore as the dominant phase, even sample A-8, which had 13 wt % impurities in the product. Several trends were observed. Si could not be incorporated significantly into any of the primary ceramic phases. $SiO_2$ forms a separate glassy phase that contains significant amounts of Ca, Al, Ti, and other impurities but little or no Pu or U. The same effect seems to be observed for P. $P_2O_5$ was not intentionally added to the form, but was found to be present at about 200 ppm in the $TiO_2$ starting material. $P_2O_5$ forms a separate phase (presumably whitlockite) that is rich in Ca and P. In general, all other impurities were either vaporized or accommodated into at least one of the primary ceramic phases. Compositions that were low in impurities produced ceramics that were for the most part rich in brannerite and lean in zirconolite, and compositions that were rich in impurities produced ceramics that were for the most part lean in brannerite and rich in zirconolite. As mentioned earlier, the impurities seem to enhance the reaction kinetics considerably. Compositions with the highest impurity levels had the least amount of actinide oxide in the product, as low as 0.04 vol %, and compositions with the lowest impurity levels had the greatest amount of actinide oxide in the product, as high as 0.6 vol %. Based on image analysis of the SEM images obtained, the compositional range observed in the suite of impurities tests was as follows: pyrochlore—62 to 90 vol %, brannerite—0 to 22 vol %, zirconolite—0 to 25 vol %, rutile—0 to 16 vol %, actinide oxide—0.004 to 0.6 vol %, and silicate glass—0 to 6 vol %, as shown in Table III.

Note that these samples were fired at 1350 deg C for 4 hours in an argon atmosphere. Sample compositions with $CeO_2$ used 0.634 times the $PuO_2$ mass listed in order to keep the molar compositions the same.

TABLE III

Product Mineralogy

| Mineralogy | Baseline (vol %) | Observed Range (vol. %) | Acceptable Range (vol %) |
|---|---|---|---|
| Pyrochlore | 80 | 62–90 | >50 |
| Brannerite | 12 | 0–22 | 0–50 |
| Zirconolite | 0 | 0–25 | 0–50 |
| Rutile | 8 | 0–16 | 0–20 |
| Actinide Oxide | 0.5 | 0.04–0.6 | 0–1 |
| Silicate and other phases | 0 | 0–6 | 0–10 |

Many of the samples were analyzed by electron microprobe analysis. These data were used to generate the preliminary partitioning coefficients given in Table IV. As is readily seen, the more common impurities, namely Al, Cr, Fe, Ni, Ga, and Mg, partition preferentially into zirconolite. A few impurities partition preferentially into the pyrochlore phase, namely Mo, Ta, and W. Na, K, and Zn tend to vaporize and/or to partition into the silica-rich glassy phase, but the little that remains in the primary phases does seem to partition selectively. Some data are also given for the relative partitioning of impurities into brannerite compared to pyrochlore. With the possible exceptions of Ni and Zn, the impurities do not seem to partition significantly into the brannerite phase.

TABLE IV

Approximate partitioning coefficients for various impurities.

| Element | $X_{zirconolite}/X_{pyrochlore}$ | $X_{brannerite}/X_{pyrochlore}$ |
|---|---|---|
| Al | 16 | 2.3 |
| Cr | 15 | — |

TABLE IV-continued

Approximate partitioning coefficients for various impurities.

| Element | $X_{zirconolite}/X_{pyrochlore}$ | $X_{brannerite}/X_{pyrochlore}$ |
|---|---|---|
| Fe | 3 | 1 |
| Ga | >30 | — |
| K | <0.05 | — |
| Mg | 3.0 | <0.1 |
| Mo | 0.10 | 0.20 |
| Na | <0.1 | 0.2 |
| Ni | 1.5 | 2 |
| Ta | <0.1 | <0.1 |
| W | 0.020 | — |
| Zn | 4 | 5 |

The partitioning coefficient is given as the mole fraction of the element in the phase of interest divided by the mole fraction of the element in the pyrochlore phase.

The maximum impurity levels demonstrated are as shown in Table V.

TABLE V

Maximum Impurity Levels Demonstrated

| Impurity | Product Concentration (wt %) | Equivalent Feed Concentration (wt %) |
|---|---|---|
| $Al_2O_3$ | 10.0 | 48.3 |
| $B_2O_3$ | 1.0 | 7.8 |
| BaO | 2.3 | 16.3 |
| $CaCl_2$ | 2.19 | 15.8 |
| $CaF_2$ | 10.0 | 48.3 |
| CaO | 10.0 | 48.3 |
| $Cr_2O_3$ | 10.0 | 48.3 |
| $Cu_2O$ | 10.0 | 48.3 |
| $Fe_2O_3$ | 10.0 | 48.3 |
| $Ga_2O_3$ | 15.3 | 60.2 |
| $K_2O$ | 1.05 | 8.9 |
| MgO | 10.0 | 48.3 |
| $MnO_2$ | 10.0 | 48.3 |
| $MoO_3$ | 10.9 | 50.7 |
| $Na_2O$ | 0.47 | 4.3 |
| $Nb_2O_5$ | 10.7 | 50.2 |
| NiO | 10.0 | 48.3 |
| $P_2O_5$ | 5.1 | 31.0 |
| PbO | 0.5 | 4.2 |
| $SiO_2$ | 1.50 | 12.7 |
| $SnO_2$ | 4.1 | 26.6 |
| $Ta_2O_5$ | 13.0 | 55.8 |
| $WO_3$ | 16.4 | 62.3 |
| ZnO | 10.0 | 48.3 |
| Max.Tot. | 13.0 | 55.7 |

Max. Tot. is the maximum combined total of impurities that was tested. Product concentration is the concentration of the impurity in the immobilized product. Equivalent feed concentration is the equivalent feed concentration of the impurity in the $PuO_2$ feed.

Stability with Respect to the DWPF Pour

Since it is planned that cans containing the ceramic will be enveloped in molten glass during the glass pouring operation at the DWPF, it is important to know that the ceramic will remain stable during this process. Tests in this area fell into two basic areas: evaluation of potential mineralogical and compositional changes during the heating and the slow cool-down, and evaluation of potential cracking during the rapid heat-up.

The heating and slow cool down process was simulated by heating the product forms to between 1000 and 1200 deg C and cooling at between 1 and 2 deg C per minute. In every case, no mineralogical change was observed. Phase compositions before and after thermal treatment were analyzed by electron microprobe or quantitative EDS analysis. In every case, there was little or no compositional change. Any small compositional differences observed were well within the statistical variations expected. Compositions before and after one of the thermal treatment tests are given in Table VI. In this particular test, the previously mentioned zirconolite-rich samples were used. These were the samples with the final firing temperature of 1350 deg C. One of the two samples was then subjected to a simulated DWPF thermal heating and cooling cycle: heat to 1000 deg C, hold for 15 minutes, cool to 500 deg C at 2 deg C per minute, then cool to ambient at 1 deg C per minute or slower. There were five phases in the sample: zirconolite, pyrochlore, rutile, hollandite, and "reacted" $PuO_2$. Only the compositions for the Pu-bearing phases are given in Table IV. Under the column of DWPF, a "no" means that the data are from the sample that was not subjected to the simulated DWPF thermal cycle and a "yes" means that the data are from the sample that was subjected to the simulated DWPF thermal cycle. Note that the compositional analyses are surprisingly close, even for the "reacted" $PuO_2$.

A test was also performed in which molten DWPF-type glass was heated to about 1100 deg C and was then poured directly onto bare non-radioactive ceramic pellets to determine qualitatively how badly the ceramic would crack because of the thermal shock. In short, the cracking was minimal. Out of 7 pellets, ranging from 2.5 to 4 cm in diameter, only one pellet cracked into two separate pieces. All the other pellets remained intact, with little or no observed cracking.

TABLE VI

Effect of DWPF heating and cooling cycle on mineralogical composition
(Compositions determined by electron microprobe analysis. Totals may not exactly final column because of rounding.)

| Phase | DWPF | CaO | BaO | $GdO_{1.5}$ | $ZrO_2$ | $PuO_2$ | $TiO_2$ | $AlO_{1.5}$ | Total |
|---|---|---|---|---|---|---|---|---|---|
| Zirconolite | No | 0.612 | 0.000 | 0.238 | 0.799 | 0.194 | 1.757 | 0.399 | 4.000 |
| Zirconolite | Yes | 0.633 | 0.000 | 0.234 | 0.805 | 0.201 | 1.732 | 0.394 | 4.000 |
| Pyrochlore | No | 0.713 | 0.022 | 0.255 | 0.225 | 0.617 | 2.131 | 0.037 | 4.000 |
| Pyrochlore | Yes | 0.739 | 0.037 | 0.238 | 0.230 | 0.622 | 2.089 | 0.045 | 4.000 |
| $PuO_2$ | No | 0.000 | 0.007 | 0.044 | 0.188 | 0.717 | 0.044 | 0.000 | 1.000 |
| $PuO_2$ | Yes | 0.000 | 0.008 | 0.044 | 0.186 | 0.724 | 0.040 | 0.000 | 1.000 |

From the data on impurity effects it is possible to generate a preliminary set of feed impurity specifications. It was learned that most impurities fell into one of four categories: (1) volatiles, (2) zirconolite stabilizers, (3) pyrochlore stabilizers, and (4) glass formers. The preliminary specification limits are given in Table VII. The limits given are all based on impurity sample A-9 (5.1 wt % impurities in the product) except for the limit on pyrochlore stabilizers, which is based on sample A-8 (13 wt % impurities in the product). The limits are reported in total moles per mole of $PuO_2$. Molar ratio is used rather than weight ratio since the impurities substitute into the ceramic form on an atomic basis and not on a weight basis. It is expected with further testing that the draft limits given in Table VII can be relaxed considerably.

TABLE VII

Preliminary specification limits on feed impurities.

| Category | Moles per mole $PuO_2$ | Impurities |
|---|---|---|
| Volatiles | 0.60 | NaCl, KCl, $CaCl_2$, $CaF_2$, $MgF_2$, etc. |
| Zirconolite stabilizers | 0.75 | $AlO_{1.5}$, $FeO_{1.5}$, $GaO_{1.5}$, $CrO_{1.5}$, MgO, $ZrO_2$, $HfO_2$, etc. |
| Pyrochlore stabilizers | 0.40 | $WO_2$, $MoO_2$, $TaO_{2.5}$, $NbO_{2.5}$ |
| Glass formers | 0.30 | $SiO_2$, $BO_{1.5}$ |

Following immobilization of the actinides in ceramic form, the ceramic may be loaded into cans. The cans may then be loaded into canisters, with high level waste glass poured into the canisters around the cans.

Obviously numerous modifications and variations of the present invention are possible in the light of the above teachings. It is therefore to be understood that within the scope of the appended claims the invention may be practiced otherwise than as specifically described therein.

What is claimed is:

1. A ceramic composition to immobilize actinides comprising:
    pyrochlore ($X_2Ti_2O_7$) at greater than 50% volumetric ratio, where X is selected from the group consisting of Ca, Gd, Hf, Sm, and actinides;
    up to about 50% by volume brannerite ($YTi_2O_6$), where Y is an actinide;
    up to about 50% by volume zirconolite ($CaATi_2O_7$), where A is selected from the group consisting of Zr, Hf, Gd, and Sm;
    up to about 20% by volume rutile ($TiO_2$);
    and up to about 1% by volume actinide oxide.

2. The ceramic composition according to claim 1, wherein:
    said actinides are at no greater than 32 weight percent.

3. The ceramic composition according to claim 2, wherein:
    said actinides are selected from the group consisting of U, Pu, Th, Np and Am.

4. The ceramic composition according to claim 3, wherein:
    said actinides are uranium and plutonium.

5. The ceramic composition according to claim 4, wherein:
    the ratio of uranium to plutonium is 2:1 by weight percent.

6. The ceramic composition according to claim 1, wherein:
    said pyrochlore volumetric ratio is about 80%;
    said brannerite volumetric ratio is about 12%;
    said zirconolite volumetric ratio is about 0%;
    said rutile volumetric ratio is about 8%;
    and said actinide oxide volumetric ratio is less than 0.5%.

7. The ceramic composition according to claim 6, further comprising:
    up to about 10% volumetric ratio other phases wherein said other phases are selected from the group consisting of silicate, whitlockite, monazite, perovskite, magnesium titanate, ilmenite, pseudobrookite, corundum, calcium uranium vanadate, hafnium titanate, magnesium aluminum titanate, magnetoplumbite, and calcium aluminum titanate.

8. A ceramic composition to immobilize uranium and plutonium comprising:
    about 10.0% by weight CaO;
    about 35.8% by weight $TiO_2$;
    about 10.6% by weight $HfO_2$;
    about 8.0% by weight $Gd_2O_3$;
    about 23.7% by weight $UO_2$;
    and about 11.9% by weight $PuO_2$.

9. ceramic composition to immobilize uranium and plutonium comprising:
    CaO, $TiO_2$, $HfO_2$, $Gd_2O_3$, $UO_2$, and $PuO_2$;
    the molar ratio of Hf to Pu being greater than or equal to unity;
    the molar ratio of Gd to Pu being greater than or equal to unity;
    the molar ratio of $UO_2$ to $PUO_2$ being 2:1;
    the weight % of $UO_2$ and $PuO_2$ being no greater than 36%;
    said CaO being about 10% by weight;
    and said $TiO_2$ being about 35% by weight.

* * * * *